(12) United States Patent
Hemphill et al.

(10) Patent No.: US 10,000,161 B2
(45) Date of Patent: Jun. 19, 2018

(54) MOUNTING STRUCTURE FOR TRUCK BOX SIDE

(71) Applicant: Ford Global Technologies, LLC, Dearborn, MI (US)

(72) Inventors: Joshua R. Hemphill, White Lake, MI (US); Dragan B. Stojkovic, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 15/296,154

(22) Filed: Oct. 18, 2016

(65) Prior Publication Data

US 2018/0105120 A1    Apr. 19, 2018

(51) Int. Cl.
*B60R 9/00* (2006.01)
*B60R 9/06* (2006.01)
*B60R 11/00* (2006.01)

(52) U.S. Cl.
CPC .............. *B60R 9/065* (2013.01); *B60R 11/00* (2013.01); *B60R 2011/004* (2013.01); *B60R 2011/0052* (2013.01); *B60R 2011/0084* (2013.01); *B60R 2011/0096* (2013.01)

(58) Field of Classification Search
CPC ... B60R 9/065; B60R 11/00; B60R 2011/004; B60R 2011/0052; B60R 2011/0084; B60R 2011/0096
See application file for complete search history.

(56) References Cited

U.S. PATENT DOCUMENTS

| 5,484,092 | A | 1/1996 | Cheney |
| 6,145,719 | A | 11/2000 | Robert |
| 8,657,127 | B2 | 2/2014 | Diaz, Jr. et al. |
| 2017/0232607 | A1* | 8/2017 | Michael .................. B25H 3/04 312/107 |

* cited by examiner

*Primary Examiner* — Lori L Lyjak
(74) *Attorney, Agent, or Firm* — Jason C. Rogers; Brooks Kushman P.C.

(57) ABSTRACT

A vehicle includes a box, a plate and a compartment. The box is attached to a cab at a headboard and includes two sidewalls extending perpendicularly from the headboard and a bed. The plate is secured to either of the sidewalls and defines a groove keyed to receive a cleat configured to lock within the groove. The compartment is locked to the sidewall via the cleat and has an insert configured to slide out of the compartment, parallel to the sidewall on a track and roller. The insert includes a lock to maintain a position of the insert within the compartment.

19 Claims, 3 Drawing Sheets

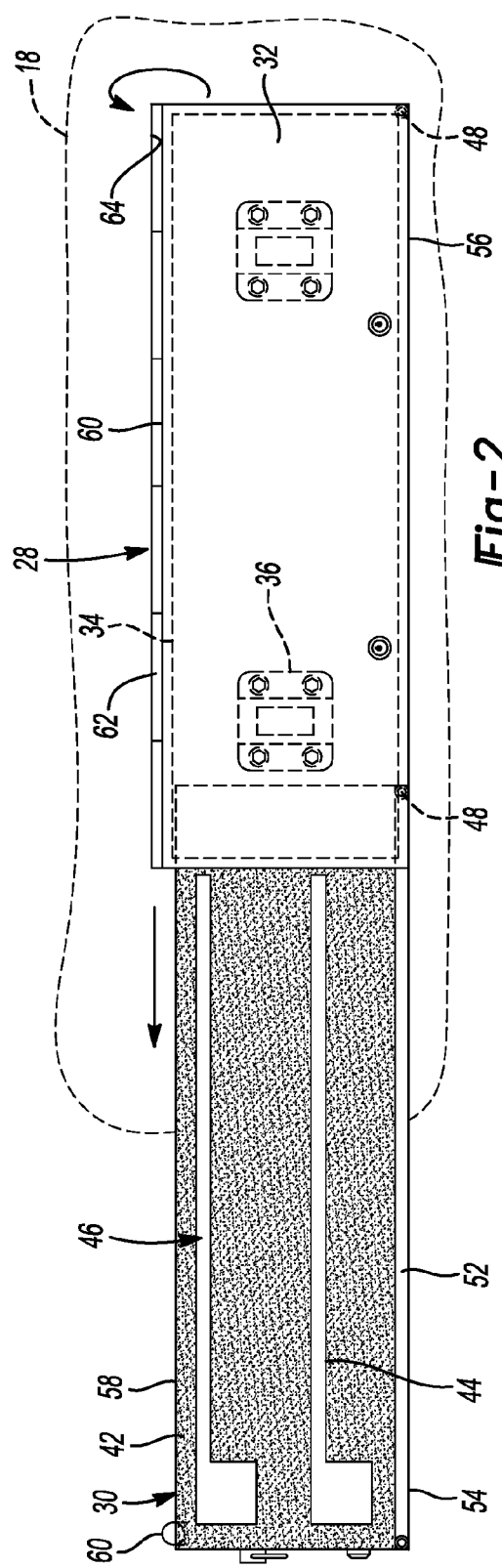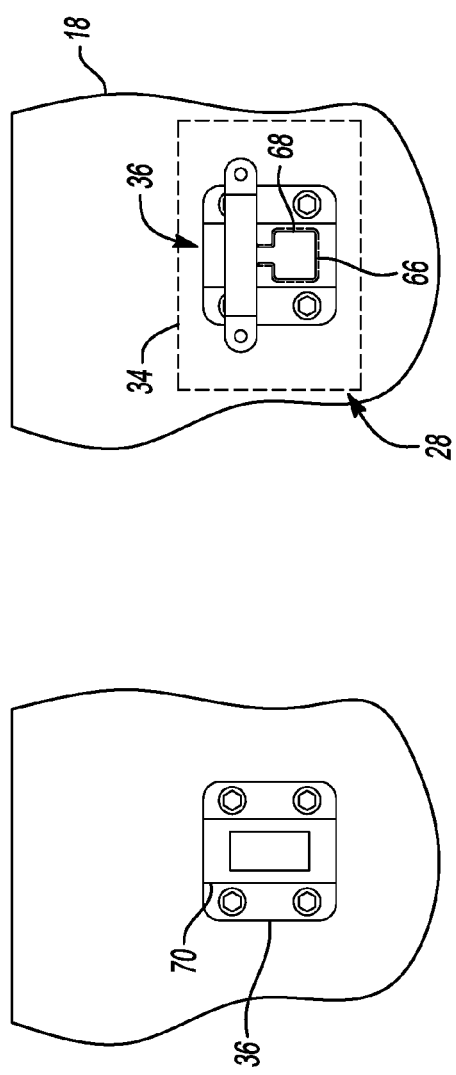

MOUNTING STRUCTURE FOR TRUCK BOX SIDE

TECHNICAL FIELD

The present disclosure relates to a mount for storage compartments on a vehicle box sidewall.

BACKGROUND

Certain vehicles, such as trucks, include a box which extends from a cab. The box is typically open and includes a bed that may be used for storage. The bed may be long, making it difficult to reach, load or unload items within the box as well as allow sensitive items to slide. Storage containers are available that fit within the box on the bed against a headboard. The storage containers may also extend between sidewalls of the box to divide an area defined by the bed. The storage containers may be accessible and items may be removed from the storage containers and box unexpectedly.

SUMMARY

A vehicle box includes a sidewall having an inner surface, a plate and a compartment. The plate is secured to the inner surface of the sidewall and defines a groove keyed to receive a cleat. The cleat is configured to lock within the groove. The compartment attaches to the cleat on a first side. The compartment includes a roller disposed within a track interconnecting the compartment with an insert. The insert is configured to slide in-line with the sidewall.

A vehicle includes a box, a plate and a compartment. The box is attached to a cab at a headboard and includes two sidewalls extending perpendicularly from the headboard and a bed. The plate is secured to either of the sidewalls and defines a groove keyed to receive a cleat configured to lock within the groove. The compartment is locked to the sidewall via the cleat and has an insert configured to slide out of the compartment, parallel to the sidewall on a track and roller. The insert includes a lock to maintain a position of the insert within the compartment.

A mount for a sidewall of a vehicle box includes a plate and a compartment. The plate is disposed on an inner surface of the sidewall and defies a groove keyed to receive a cleat configured to lock within the groove. The compartment is attached to the plate via the cleat on a first side of the compartment. The compartment includes an insert disposed between the first side and a door hingedly attached to a top surface of the compartment such that the insert, upon rotation of the door, is accessible.

BRIEF DESCRIPTION OF THE DRAWINGS

FIG. 2 is a side view of a storage compartment secured to a sidewall of the box;

FIGS. 3A-3B are partial side views of a plate to secure the storage compartment to the sidewall;

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
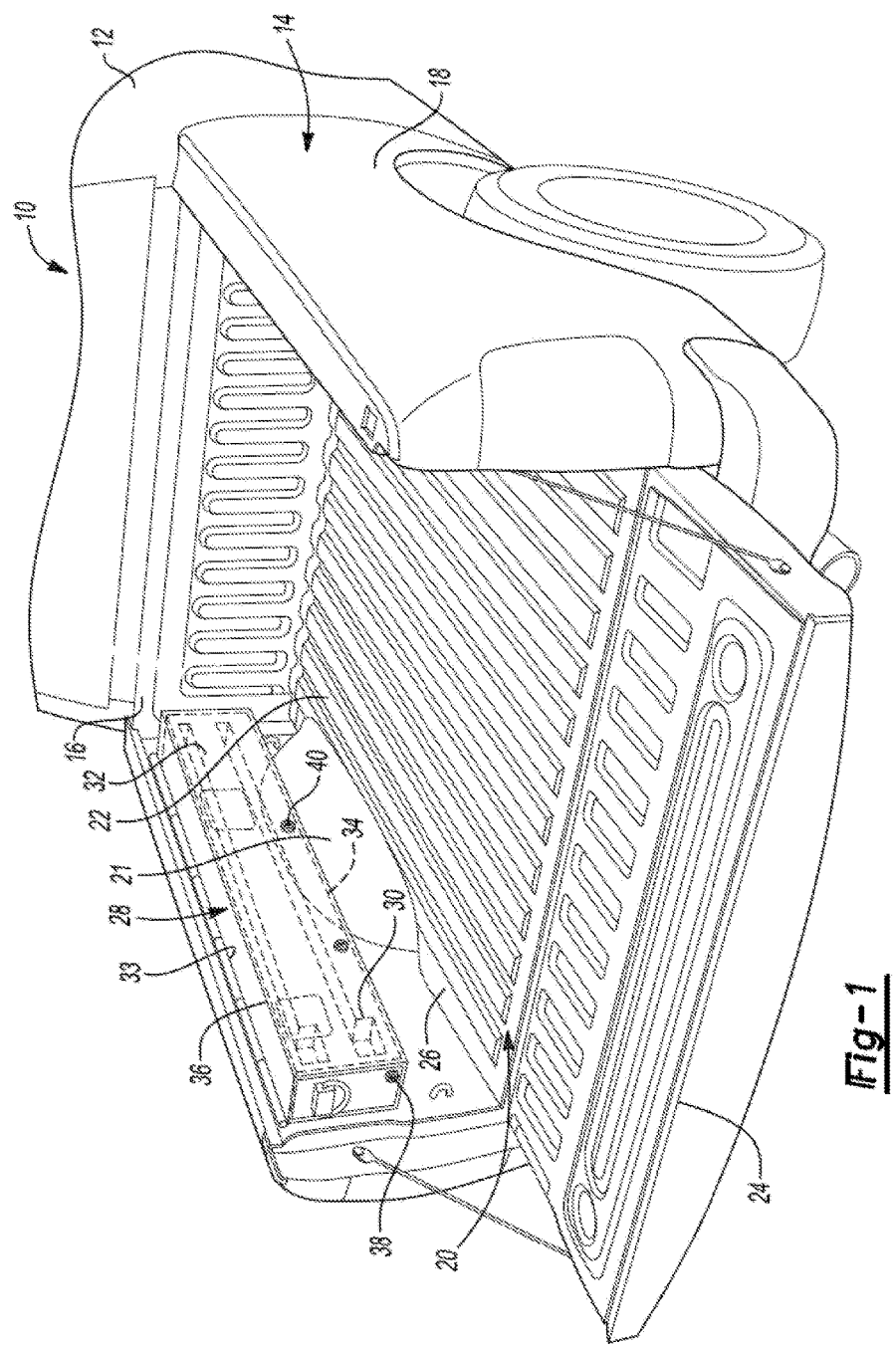
FIG. 1 is a perspective view of a vehicle having a box attached to a cab.

FIG. 1 depicts a perspective view of a vehicle 10. The vehicle 10 may be a truck. The vehicle 10 includes a cab 12 and a box 14. The box 14 attaches to the cab 12. The box 14 includes a headboard 16 disposed between two sidewalls 18, and a bed 20 perpendicular to the headboard 16 and the sidewalls 18. The headboard is disposed at a first end 22 of the bed 20 and extends vertically and normal to the bed 20. The bed 20 extends between each of the sidewalls 18 and each of the sidewalls extends vertically and normal to the bed 20. The box 14 further includes a tailgate 24 disposed opposite of the headboard 16 at a second end 26 of the bed 20. Similar to the headboard 16 and the bed 20, the tailgate 24 extends between the two sidewalls 18.

Typically, the box 14 is open, or not covered, such that the bed 20 is easily accessed over the sidewalls 18. Certain items (not shown) may be preferably transported within the box 14 and require secure storage within the box 14 or bed 20 to prevent damage to those items. For example, sporting goods, such as but not limited to hunting and fishing, may require transport within a storage compartment 28 preferably disposed within the box 14 of the vehicle 10. These items, such as fishing rods, may be delicate as well as expensive and, therefore, providing a storage compartment 28 that secures these items and prevents damage to the items may be advantageous. Further, a storage compartment 28 that provides efficient use of space within the box 14 further allows for more storage space to be available within the box 14 on the bed 20. The storage compartment 28 may be secured within the box 14 on either or both of the sidewalls 18 to allow the sidewalls 18 to secure sensitive items while still allowing the bed 20 to be used for general purpose storage.

As can be seen in FIG. 1, the storage compartment 28 may be secured to a sidewall 18 above a wheel well 21. Attaching a storage compartment 28 above the wheel well 21 allows the box 14 to store items in an area not typically used for storage. Likewise, securing the storage compartment 28 to the sidewall 18 above the bed 20 creates more storage space defined between the bed 20 and sidewalls 18, and headboard 16 and tailgate 24. The storage compartment 28 is secured to the sidewall 18 using a plate 36. The plate 36 may be a mount, or interface plate 36 such that the plate 36 is configured to mount the storage compartment 28 to the sidewall 18 and provides an interface between the storage compartment 28 and the sidewall 18. FIG. 1 depicts securing the storage compartment 28 to the sidewall 18 using two plates 36. In at least one other embodiment, the storage compartment 28 may be secured to the sidewall 18 using a single plate 36 or a plurality of plates 36. The storage compartment 28 includes an insert 30 and a door 32. The insert 30 is disposed between a first side 33 of the storage compartment 28 and the door 32 of the storage compartment 28. The insert 30 may be configured to hold items within the storage compartment 28.

As will be described in more detail below, the insert 30 may be configured to slide out of the storage compartment 28. The insert 30 slides in a direction parallel to the sidewall 18 to provide access to items held by the insert 30. Further, the door 32 may be configured to rotate in a direction perpendicular to the sidewall 18 to provide access to the insert 30, a storage area 34 defined by the storage compartment 28, as well as to the plates 36 interconnecting the storage compartment 28 to the sidewall 18. To further secure items within the storage compartment 28 such that access to the items is limited, the storage compartment 28 may further include first and second locks 38, 40 defined on the insert 30 and the door 32, respectively. The first and second locks 38, 40 prevent access to the insert 30, the storage area 34, or the plates 36 when locked. Further, either the first or second lock 38, 40 may provide a master lock. For example, if the first lock 38 defines a master lock, then, when locked, the second lock 40 may also be locked such that the door 32 may not rotate. Likewise, if the second lock 40 defines a master lock, then, when locked, the first lock 38 may also be locked such that the insert 30 may not slide. The first and second locks 38, 40 may also operate independently such that when the first lock 38 is locked, the second lock 40 may be unlocked and the door 32 may be rotated. In a similar manner, when the second lock 40 is locked, the first lock 38 may be unlocked in the insert 30 may slide.

FIG. 2 depicts a front view of the storage compartment 28 secured to the sidewall 18 via at least two plates 36 with the insert 30 in an open position, or slid away from the storage area 34 defined within the storage compartment 28 and the door 32 in a closed position, or covering the storage area 34 defined within the storage compartment 28. As stated above, the insert 30 may be configured to hold items. The insert 30 may include a pad 42. The pad 42 may be composed of foam and define indentations 44, which may mimic shapes of items to be stored within the storage compartment 28. In at least one other embodiment, the pad 42 may be composed of soft plastic, cotton, or any other soft material to avoid scratching items stored within the indentations 44. For example, the pad 42 may define indentations 44 representative of a fishing rod 46, as depicted in FIG. 2, to secure the fishing rod 46 within the storage compartment 28.

The storage compartment 28 may include a roller 48 disposed within a track 52 to interconnect the insert 30 and the storage compartment 28. For example, the track 52 may be attached to the insert 30 and be configured to slide on the roller 48. The track 52 may be attached to a bottom edge 54 of the insert 30 and the roller 48 may likewise be disposed along a bottom edge 56 of the first side 33 of the storage compartment 28. In at least one other embodiment, the track 52 may be attached to a top edge 58 of the insert 30 and the roller 48 may likewise be disposed along a top edge 58 of the first side 33. Likewise, the roller 48 may also be disposed on the door 32 as described to effectuate sliding of the insert 30. Further, the insert 30 may include a seal 60 disposed opposite of the track 52. For example, if the track is disposed along the bottom edge 54 of the insert 30, the seal 60 may be disposed along the top edge 58 of the insert 30. The seal 60 prevents moisture or fluid, such as water or any other corrosive electrolyte, from entering the storage compartment 28 and degrading the integrity of the items.

As stated above, the door 32 may be configured to rotate in a direction perpendicular to the sidewall 18. Therefore, the storage compartment 28 may further include a hinge 62. The hinge 62 may interconnect the door 32 and an upper surface 64 of the storage compartment 28. The hinge 62 allows the door 32 to rotate toward the upper surface 64 and expose the storage area 34 defined by the storage compartment 28. The hinge 62 may be fastened, adhered, welded or attached to both the door 32 and the upper surface 64 to interconnect the door 32 and the upper surface 64 of the storage compartment 28. The hinge 62 allows access to the insert 30, the storage area 34 and the plates 36. For example, rotation of the door 32 allows the insert 30 to be exposed and assessable without sliding the insert 30 as described above. Likewise, the storage area 34 and the plates 36 may be exposed upon rotation of the door 32 when the insert 30 slides, as described above. The hinge 62, therefore, allows the storage compartment 28 to provide access to the plates 36 to ensure that the storage compartment 28 is locked to the sidewall 18. Further, the hinge 62 allows for utilization of the storage area 34 such that when the insert 30 slides as described, the storage area 34 is exposed and assessable to allow for further storage of items within the storage compartment 28.

Referring to FIGS. 3A and 3B, a front view of the plates 36 interconnecting the first side 33 of the storage compartment 28 and the sidewall 18 is depicted. As previously described, the plates 36 are configured to lock the storage compartment 28 against the sidewall 18. The plates 36 define a groove 66 and include a cleat 68. The groove 66 is keyed to receive the cleat 68. Plates 36, including the groove 66, are fixed to the sidewall 18 and the cleat 68 is fixed to the storage compartment 28 to interconnect the sidewall 18 and the storage compartment 28. Further, the cleat 68 is configured to lock within the groove 66 such that the storage compartment 28 may not be removed from the sidewall 18. Locking the cleat 68 within the groove 66 of the plates 36 prevents unintended removal of the storage compartment 28 from the sidewall 18, and the box 14. Therefore, the plates 36 via the cleat 68 and the groove 66 secure the storage compartment 28 permanently to the sidewall 18. In at least one other embodiment, the plates 36, via the cleat 68 in the groove 66, may be configured to temporarily attach the storage compartment 28 to the sidewall 18, or be configured to unlock and remove the storage compartment 28 from the sidewall 18.

The plates 36 may further include a block out plate 70. The block out plate 70 may be configured to cover the plates 36, and specifically cover the groove 66. The block out plate 70 may be fastened over the plates 36 when the plates 36 are not being used to attach the storage compartment 28 to the sidewall 18. For example, when the storage compartment 28 is not being used, and therefore not attached to the sidewalls 18, the block out plate 70 is secured to the sidewall 18 over the plates 36. The block out plate 70 is configured to protect the plates 36 from corrosion or other incidental damage. For example, when not in use, the groove 66 may be exposed to corrosive elements or damage during normal operation of the box 14. If the groove 66 becomes corroded or damaged, the groove 66 may be altered or weakened. If the groove 66 is altered or weakened, the cleat 68 may not effectively couple the storage compartment 28 to the sidewall 18. For example, if the groove 66 is corroded, then the cleat 68 may fracture the plate 36 due to the corrosion. Likewise, if the groove 66 is damaged, then the cleat 68 may fracture the plate 36. If the plate 36 is fractured, the cleat 68 may not effectively support the storage compartment 28 on the sidewall 18, or allow for unexpected removal of the storage compartment 28 from the sidewall 18. In this regard, the block out plate 70 protects the plate 36, and specifically the groove 66, to ensure that the plate 36 via the groove 66 in cleat 68 remain engaged such that the storage compartment 28 is locked against the sidewall 18 of the box 14.

Figure 4:
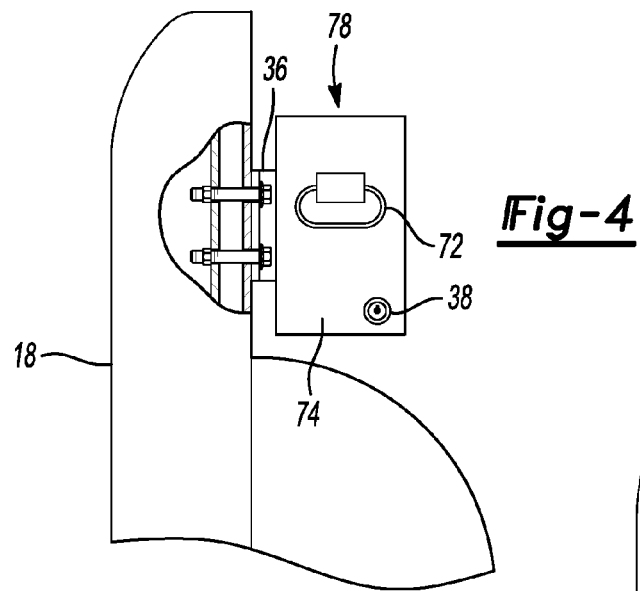
FIG. 4 is an end view of the vehicle box showing the interconnection of the sidewall and the storage compartment.

FIG. 4 depicts an end view of the storage compartment 28 secured, via the plate 36, to the sidewall 18. As can be seen in FIG. 4, the insert 30 may further include a handle 72. The handle 72 may aid an effectuating movement of the insert 30 in a manner described above. For example, the handle 72, in response to a force acting in a direction away from the storage compartment 28, may pull the insert 30 from the storage compartment 28. Therefore, the handle 72 aids the insert 30 in sliding in a direction away from the storage compartment 28. The handle 72 may be substantially circular such that the handle 72 may be ring-shaped and fastened, adhered, bonded or otherwise attached to a front surface 74 of the insert 30. In at least one other embodiment, the handle 72 may resemble a knob, a hook, a tab or any other structure which allows a user to pull the handle 72 in a direction away from the storage compartment 28 to allow the insert 30 to slide as described above. Also depicted in FIG. 4 is the lock 38 to lock the insert within the storage compartment 28, as previously described. As can be seen in FIG. 4, the lock 38 is disposed on the front surface 74 of the insert 30 and may be configured to lock the insert against the first side 33 of the storage compartment 28. In at least one other embodiment, the lock 38 may be configured to lock the insert 30 against the door 32 of the storage compartment.

Figure 5:
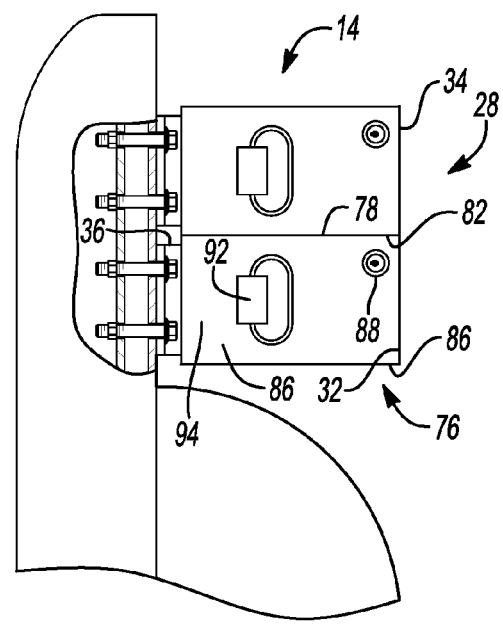
FIG. 5 is an end view of a further embodiment of a mount for attaching multiple storage compartments to the sidewall.

FIG. 5 depicts a further embodiment of the vehicle box 14. The embodiment depicted in FIG. 5 shows a stackable configuration using more than one storage compartment 28 being attached to the sidewall 18 of the box 14. Again, the plates 36 may be used to attach the storage compartments 28 to the sidewall 18. The stackable configuration depicted in FIG. 5 stacks the storage compartments 28 vertically such that an additional or second storage compartment 76 is secured to a bottom surface 78 of the storage compartment 28. The additional storage compartment 76 is secured to the bottom surface 78 of the storage compartment 28 using the plates 36. For example, the plates 36 may be used to interconnect and secure the second storage compartment 76 to the sidewall 18 immediately adjacent and below the storage compartment 28 such that a top surface 80 of the second storage compartment 76 is flush with, or in planar contact with the bottom surface 78 of the storage compartment 28. The plates 36 used to secure the second storage compartment 76 to the sidewall 18 may lock the second storage compartment 76 to the sidewall 18 in a manner similar to that described above.

In this embodiment, the door 32 may be configured to extend a length 82 defined by the combination of the storage compartment 28 and the second storage compartment 76. In this way, a single door 32 may be used to provide access to both the storage compartment 28 and the second storage compartment 76 as was detailed above. The second storage compartment 76 may also include a second storage area (not shown) accessible via the door 32. In at least one other embodiment, the second storage compartment 76 may define an additional, or second door 84 hingedly attached to the top surface 80 of the second storage compartment 76 such that the second door operates as the door 32 described above. With either a single door 32 covering the length 82, or with the second door 84, the plates interconnecting the second storage compartment 76 may be accessed via rotation of the door 32 or the second door 84, as described above depending on the embodiment.

The second storage compartment 76 may also include a second insert 86 and an additional lock 88. Again, the second insert 86 may be configured to slide in a manner similar to the insert 30 described above. The additional lock 88 may work in conjunction with the first and second locks 38, 40 described above. For example, if the first lock 38 is locked, then the additional lock 88 may be configured to allow the second insert 86 to slide, or vice versa. Likewise, if the second lock 40 is locked, then the additional lock 88 may be configured to allow the second insert 86 to slide. Following the example above, if the first lock 38 defines a master lock, then, when locked, the additional lock 88 may be locked and prevent the second insert 86 to slide. Again, if the second lock 40 defines a master lock, then, when locked, the additional lock 88 may be locked and prevent the second insert 86 to slide.

Figure 6:
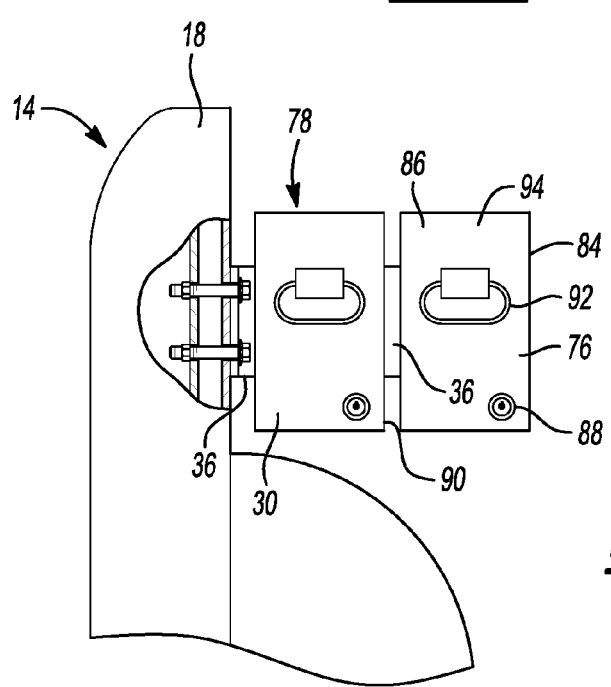
FIG. 6 is an end view of another embodiment of a mount for attaching multiple storage compartments to the sidewall.

FIG. 6 depicts another embodiment of the vehicle box 14. The embodiment depicted in FIG. 6 shows a stackable configuration using more than one storage compartment 28 being attached to the sidewall 18 of the box 14. Again, the plates 36 may be used to attach the storage compartments 28 to the sidewall 18. The stackable configuration depicted in FIG. 6 stacks the storage compartments 28 horizontally such that the additional or second storage compartment 76 is secured to a second side 90 of the storage compartment 28. In the horizontal stack, the second storage compartment 76 is secured to the second side 90 of the storage compartment 28 using the plates 36 in a manner similar to the plates 36 locking the storage compartment 28 against the sidewall 18 as described above. Therefore, the plates 36 are further configured to support the additional weight of the second storage compartment 76 as well as the second insert 86 and the items (not shown) stored within the second storage compartment.

In this embodiment, the second door 84 provides access to the second insert 86, as well as the plates 36 interconnecting the second side 90 of the storage compartment 28 and the second storage compartment 76 and the plates 36 interconnecting the storage compartment 28 and the sidewall 18. For example, the plates 36 interconnecting the storage compartment 28 and the sidewall 18 are assessable when the insert 30 and the second insert 86 are both slid out from the storage compartment 28 and the second storage compartment 76 when the second door 84 is rotated as described above. Likewise, the plates 36 interconnecting the second side 90 of the storage compartment 28 and the second storage compartment 76 are assessable when the second insert 86 is slid out from the second storage compartment 76 when the second door 84 is rotated as described above.

Again, in this embodiment, the additional lock 88 may prevent the second insert 86 from sliding out of the second storage compartment 76. The additional lock 88 may work independently of the first lock 38 to allow the second insert 86 and the insert 30 to slide out of the second storage compartment 76 and the storage compartment 28, respectively. For example, when the additional lock 88 is locked, the insert 30 may slide out of the storage compartment 28 and when the first lock 38 is locked, the second insert 86 may slide out of the second storage compartment 76. Similarly, the additional lock 88 and the first lock 38 may work in conjunction as in the master lock examples above. For example, if the additional lock 88 is locked and defines a master lock, then the first lock 38 maintains a locked position and the insert 30 may not slide out of the storage compartment 28. Likewise, if the first lock 38 is locked and defines a master lock, then the additional lock 88 maintains a locked position and the second insert 86 may not slide out of the second storage compartment 76. Further, the second lock 40 may be disposed on the second door 84. Therefore, the additional lock 88 and the first lock 38 may work independently of the second lock 40 on the second door 84 as previously described or, if the second lock 40 disposed on the second door 84 defines a master lock, then, when locked, the second lock 40 may prevent the second insert 86 and the insert 30 from sliding out of the second storage compartment 76 and the storage compartment 28, respectively.

In both embodiments shown in FIGS. 5 and 6, the second storage compartment 76 further includes a second handle 92. The second handle 92 may be disposed on a front surface 94 of the second storage compartment 76. The second handle 92 may define a substantially similar size and shape as well as material as the handle 72 disposed on the front surface 74 of the storage compartment 28. Again, the second handle 92 may be configured to operate in a substantially similar manner as the first handle 72 of the storage compartment 28. Therefore, in response to a force acting perpendicularly to the front surface 94 of the second storage compartment 76, the second handle 92 effectuate sliding of the second insert 86 away from the second storage compartment 76. The stackable configurations of the storage compartment 28 and the second storage compartment 76 provide further storage and use of the sidewall 18.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle box comprising:
    a sidewall having an inner surface;
    a plate secured to the inner surface of the sidewall and defining a groove keyed to receive a cleat configured to lock within the groove; and
    a compartment attached to the cleat on a first side and including a roller disposed within a track interconnecting the compartment with an insert such that the insert is configured to slide in-line with the sidewall.

2. The vehicle box of claim 1, wherein the insert includes a lock to prevent the insert from sliding along the track.

3. The vehicle box of claim 1, wherein the compartment further includes a door hingedly disposed on an upper surface of the compartment such that the door rotates in a direction normal to the compartment.

4. The vehicle box of claim 1, wherein the insert further includes a handle configured to effectuate sliding the insert on the track.

5. The vehicle box of claim 1, wherein the insert is configured to hold items within the compartment via pad formed with the insert.

6. The vehicle box of claim 3, wherein the door further includes a second lock to prevent the door from rotating.

7. A vehicle comprising:
    a box attached to a cab at a headboard and including two sidewalls extending perpendicularly from the headboard and a bed;
    a plate secured to either of the sidewalls and defining a groove keyed to receive a cleat configured to lock within the groove; and
    a compartment locked to the sidewall via the cleat and having a first insert configured to slide out of the compartment, parallel to the sidewall on a track and roller, wherein the first insert includes a lock to maintain a position of the first insert within the compartment.

8. The vehicle of claim 7, wherein the cleat is configured to attach to a first side of the compartment to interconnect the compartment to either of the sidewalls via the plate.

9. The vehicle of claim 8 further comprising a second plate defining an additional groove keyed to receive an additional cleat, wherein the second plate is secured to a second side of the compartment.

10. The vehicle of claim 9 further comprising a second compartment locked to the second side of the compartment via the second plate.

11. The vehicle of claim 10, wherein the second side of the compartment is disposed opposite and parallel to the first side of the compartment.

12. The vehicle of claim 10, wherein the second side of the compartment is disposed adjacent and perpendicular to the first side of the compartment.

13. The vehicle of claim 10, wherein the second compartment further includes a second insert configured to slide out of the second compartment, parallel to the insert if the first insert is locked within the compartment.

14. The vehicle of claim 10, wherein the second compartment further includes a second insert and lock configured to maintain a position of the second insert within the second compartment if the insert is locked, via the lock, within the compartment.

15. A mount for a sidewall of a vehicle box comprising:
    a plate disposed on an inner surface of the sidewall and defining a groove keyed to receive a cleat configured to lock within the groove; and
    a compartment attached to the plate via the cleat on a first side of the compartment, the compartment including an insert disposed between the first side and a door hingedly attached to a top surface of the compartment such that the insert, upon rotation of the door, is accessible.

16. The mount of claim 15 further comprising a second compartment attached to the compartment on a bottom surface of the compartment.

17. The mount of claim 16, wherein the door extends a length of the compartment and the second compartment.

18. The mount of claim 16, wherein rotation of the door provides access to the insert and a second insert disposed with the compartment.

19. The mount of claim 16, wherein the second compartment further includes a second door such that, upon rotation of a second door hingedly attached to a top surface of the second compartment, a second insert disposed within the second compartment is accessible.

\* \* \* \* \*